(12) United States Patent
Oh

(10) Patent No.: US 8,641,538 B2
(45) Date of Patent: Feb. 4, 2014

(54) DOUBLE OFFSET CONSTANT VELOCITY JOINT

(75) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/463,864

(22) Filed: May 4, 2012

(65) Prior Publication Data

US 2012/0283030 A1 Nov. 8, 2012

Related U.S. Application Data

(60) Provisional application No. 61/483,148, filed on May 6, 2011.

(51) Int. Cl.
*F16D 3/226* (2006.01)

(52) U.S. Cl.
USPC .......................................... 464/146; 464/906

(58) Field of Classification Search
USPC .......................... 464/145, 146, 906
See application file for complete search history.

(56) References Cited

U.S. PATENT DOCUMENTS

| | | | |
|---|---|---|---|
| 2,150,952 A * | 3/1939 | Ward | 464/146 |
| 3,464,232 A | 9/1969 | Hutchinson | |
| 3,664,152 A | 5/1972 | Macielinski | |
| 3,789,626 A | 2/1974 | Girguis | |
| 4,008,582 A | 2/1977 | Welschof | |
| 4,034,576 A | 7/1977 | Takahashi et al. | |
| 4,432,740 A | 2/1984 | Petiot | |
| 7,666,102 B2 | 2/2010 | Feichter | |

FOREIGN PATENT DOCUMENTS

| | | |
|---|---|---|
| DE | 2114536 B1 | 7/1972 |
| DE | 2529695 B1 | 1/1976 |
| DE | 3626998 | 2/1988 |
| EP | 2180202 A1 | 4/2010 |
| FR | 1418233 | 11/1965 |
| FR | 1472517 A | 3/1967 |
| FR | 2083159 A5 | 12/1971 |
| FR | 2786829 A1 | 6/2000 |
| JP | 2008008475 | 1/2008 |
| PL | 74588 B1 | 12/1974 |
| WO | WO 93/16296 A1 | 8/1993 |

* cited by examiner

*Primary Examiner* — Gregory Binda
(74) *Attorney, Agent, or Firm* — Marshall & Melhorn, LLC

(57) ABSTRACT

A double offset constant velocity joint is provided. The constant velocity joint includes an outer element, an inner element, an annular element, and a plurality of torque transferring elements. The annular element has a first spherical outer surface, a second spherical outer surface, a spherical inner surface, and a plurality of perforations formed therethrough. The first spherical outer surface and the spherical inner surface have a center common with a spherical outer surface of the inner element. The second spherical outer surface has a center different from a joint pivot point and the first spherical outer surface. The second spherical outer surface has a diameter complementary to a diameter of the inner surface of the outer element. The annular element is disposed between the inner element and the outer element.

8 Claims, 9 Drawing Sheets

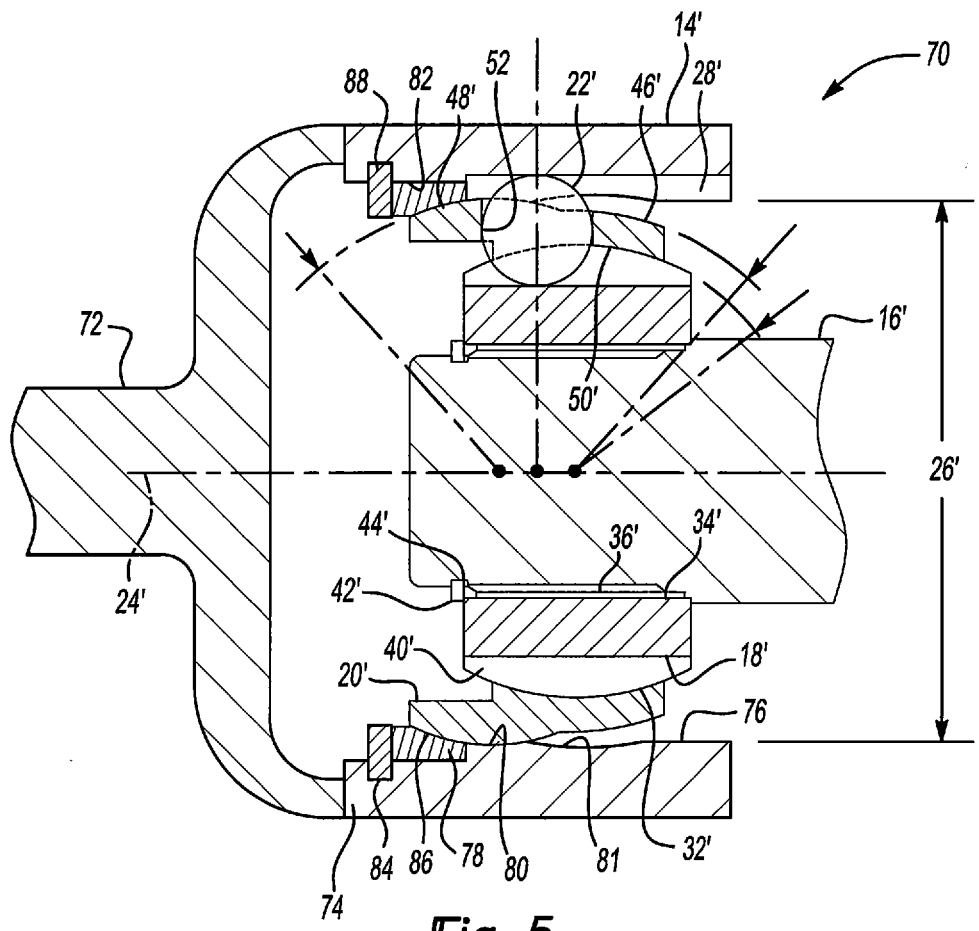
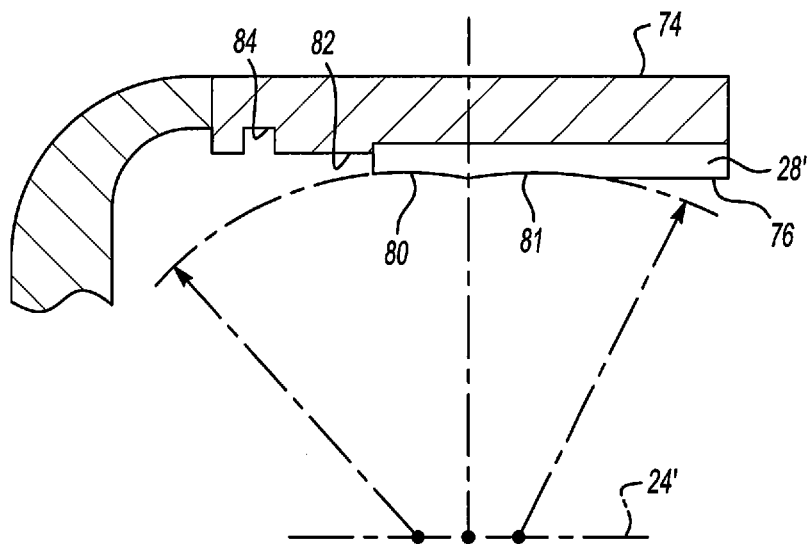

DOUBLE OFFSET CONSTANT VELOCITY JOINT

CLAIM OF PRIORITY

The present application claims the benefit of priority to U.S. Provisional Application No. 61/483,148 filed on May 6, 2011, which is incorporated herein in its entirety by reference.

FIELD OF THE INVENTION

The present invention relates to constant velocity joints and more particularly to double offset constant velocity joints.

BACKGROUND OF THE INVENTION

Constant velocity joints are well known mechanisms for transmitting power while affording angular movement between two members. A common application of the constant velocity joint is for transmitting power from the engine of a vehicle to a drive wheel of a vehicle. The constant velocity joint includes an outer race having tracks formed thereon, an inner race having tracks formed thereon, a plurality of torque transmitting elements disposed in both tracks, and a guiding element for the torque transmitting elements. Constant velocity joints may be configured to be fixed joints, which do not permit axial displacement, or plunging joints, which do permit axial displacement.

Fixed constant velocity joints typically employ arcuate tracks into which the torque transferring elements are disposed in. The arcuate tracks facilitate joint articulation and may be offset from a center of the joint to further increase joint articulation. However, such arcuate tracks, especially those formed on the outer race, are precision machined surfaces. As a result, the precision machined surfaces increase a cost and a complexity of the joint they are incorporated in. Further, the guiding element is of the fixed constant velocity joint is similarly precision formed, is conventionally designed for use with a particular inner race and outer race.

Plunging constant velocity joints, while permitting axial displacement, are also expensive and complex. Despite the presence of straight tracks in both the inner and the outer race, the plunging constant velocity joint still requires many precision machined surfaces. Particularly, the inner surfaces of the guiding element and portions of the inner race must be accurately formed.

As is known generally and particularly with respect to manufacturing, per part pricing decreases as a quantity of the parts increases. As such, the part that is interchangeable with respect to multiple assemblies decreases a cost of the assembly. With respect constant velocity joints, interchangeable parts are seldom, especially between the fixed constant velocity joint and the plunging constant velocity joint. Interchangeable parts between different types of constant velocity joints would decrease a cost of constant velocity joints, and thus a vehicle the constant velocity joints are incorporated in.

It would be advantageous to develop a double offset constant velocity joints that includes parts that are interchangeable between fixed constant velocity joints and plunging constant velocity joints to reduce a cost and a complexity of the double offset constant velocity joint.

SUMMARY OF THE INVENTION

Presently provided by the invention, a double offset constant velocity joint that includes parts that are interchangeable between fixed constant velocity joints and plunging constant velocity joints, has surprisingly been discovered.

In one embodiment, the present invention is directed to a constant velocity joint comprising an outer element, an inner element, an annular element, and a plurality of torque transferring elements. The outer element defines an outer element axis, has plurality of outer tracks formed therein, and has an inner surface. The plurality of outer tracks is parallel to the outer element axis. The inner element defines an inner element axis, has a spherical outer surface, and has a plurality of inner tracks. The plurality of inner tracks is parallel to the inner element axis and the spherical outer surface has a center different from a joint pivot point. The annular element has a first spherical outer surface, a second spherical outer surface, a spherical inner surface, and a plurality of perforations formed through the annular element. The first spherical outer surface and the spherical inner surface have a center common with the spherical outer surface of the inner element. The second spherical outer surface has a center different from a joint pivot point and the first spherical outer surface. The second spherical outer surface has a diameter complementary to a diameter of the inner surface of the outer element. The annular element is disposed between the inner element and the outer element. The plurality of torque transferring elements is disposed in the perforations formed through the annular element. Each of the torque transferring elements contacts one of the outer tracks and one of the inner tracks. The plurality of torque transferring elements cooperate with the plurality of outer tracks and the plurality of inner tracks to position the annular element in a plane bisecting an angle formed by the outer element axis and the inner element axis.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which:

FIG. 5 is a cross-sectional view of a double offset fixed constant velocity joint according to another embodiment of the present invention;

FIG. 6 is a cross-sectional view of an outer element of the double offset fixed constant velocity joint shown in FIG. 5;

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
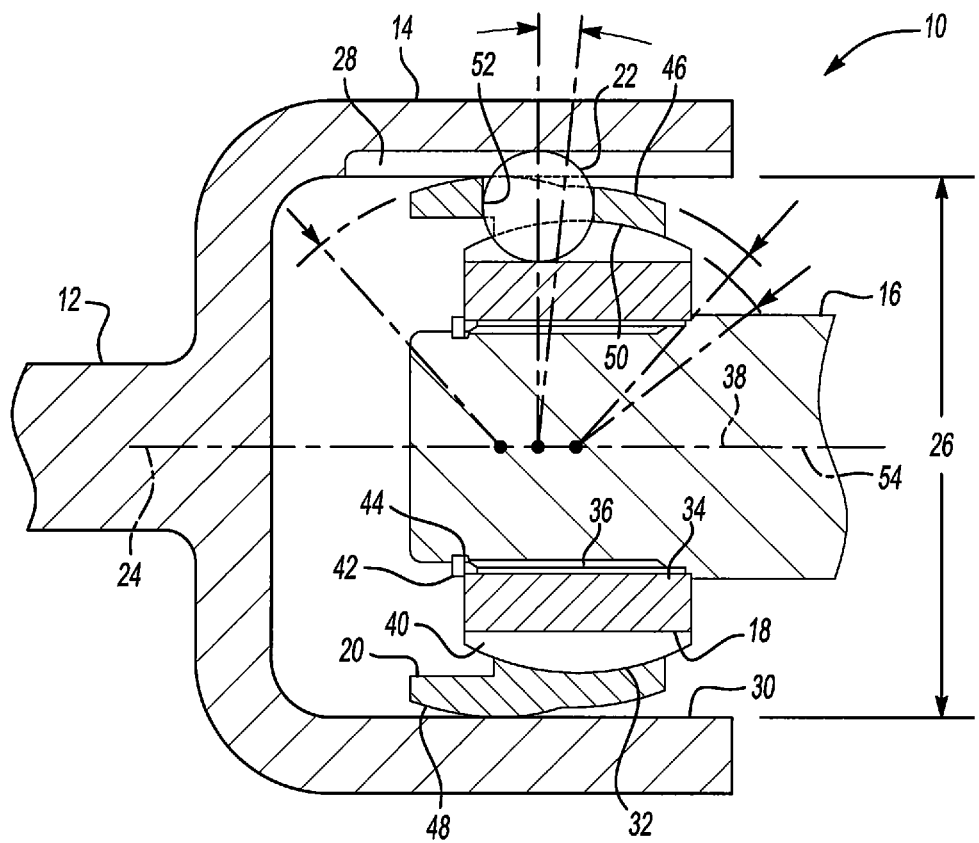
FIG. 1 is a cross-sectional view of a double offset plunging constant velocity joint according to an embodiment of the present invention.

FIG. 1 illustrates a constant velocity joint 10 according to an embodiment of the invention. The constant velocity joint 10 preferably comprises a first member 12 including an outer element 14, a second member 16 including an inner element 18, an annular element 20, and a plurality of torque transferring elements 22. As shown, the constant velocity joint 10 is a double offset plunging constant velocity joint, meaning a joint pivot point is defined by a midpoint of two separate points of articulation and the constant velocity joint 10 accommodates axial translation.

The outer element 14 is a hollow cylindrical portion of the first member 12 formed from a rigid material such as a steel. The first member 12 including the outer element 14 is typically forged and then machined in a secondary operation. However, it is understood the outer element 14 may be formed using any other process from any other material. Alternately, the outer element 14 may be formed separate from the first member 12 and coupled thereto. The outer element 14 defines an outer element axis 24 and an inner diameter 26. The outer element axis 24 is a series of points equidistant from the inner diameter 26. The outer element axis 24 is coincident with an axis of the first member 12.

A plurality of outer tracks 28 are formed in an inner surface 30 of the outer element 14. Each of the outer tracks 28 has an arcuate profile having a diameter and a centerline parallel to the outer element axis 24. Alternately, the outer element 14 may include the plurality of outer tracks 28 having alternating depths. The outer element 14 includes eight outer tracks 28 formed therein. However, it is understood that each of the outer tracks 28 may have a non-arcuate profile and any number of the outer tracks 28 may be formed in the outer element 14. The plurality of outer tracks 28 is equally spaced about the outer element axis 24.

The inner element 18 is a hollow member formed from a rigid material such as a steel. The second member 16 and the inner element 18 may be formed using any other process from any other material. The inner element 18 is typically formed separate from the second member 16 and is splinkingly disposed on an end portion of the second member 16. However, it is understood the inner element 18 may be unitarily formed with the second member 16.

The inner element 18 includes an inner element outer surface 32 and an inner element inner surface 34. The inner element outer surface 32 is a spherical surface of the outer element 18 having a center point different than the joint pivot point. The inner element inner surface 34 defines a cylindrical bore through the inner element 18. A plurality of splines 36 is formed on the inner element inner surface 34 for drivingly engaging the inner element 18 with the second member 16. An inner element axis 38 is a series of points equidistant from the inner element inner surface 34.

Figure 3:
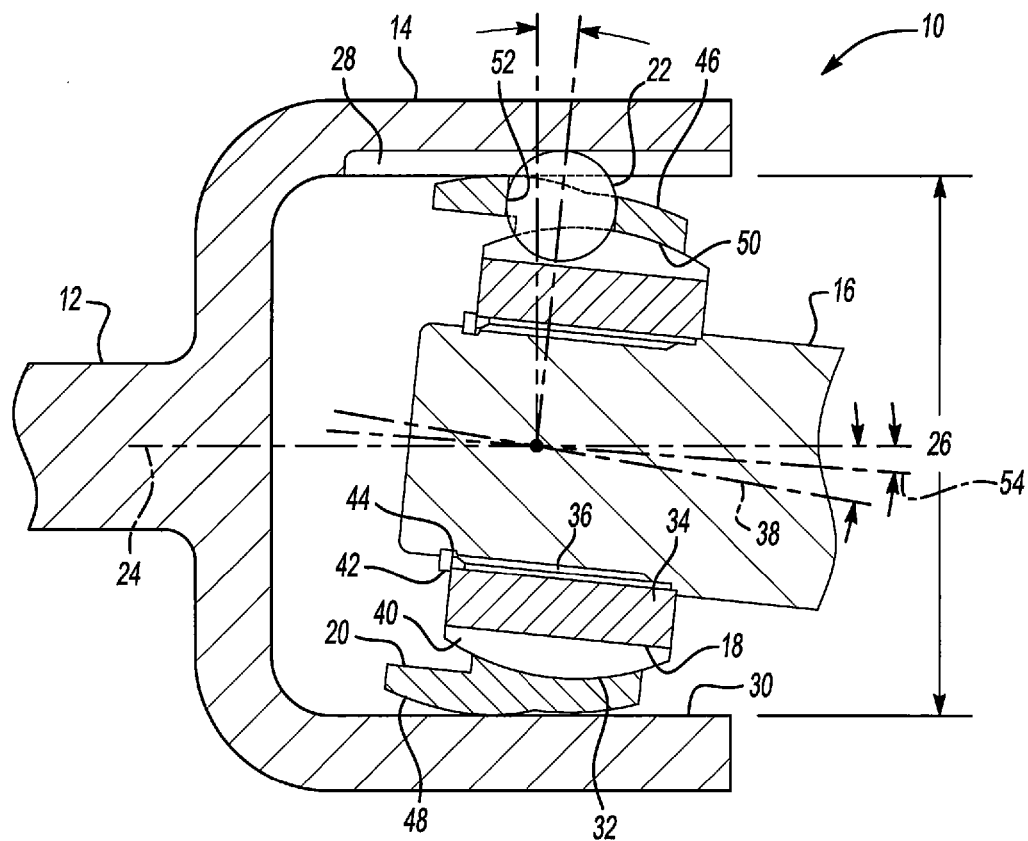
FIG. 3 is a cross-sectional view of the double offset plunging constant velocity joint shown in FIG. 1, the joint shown in an articulated position.

A plurality of inner tracks 40 are formed in the inner element outer surface 32. Each of the inner tracks 40 has an arcuate profile having a diameter and a centerline parallel to the inner element axis 38. Alternately, the inner element 18 may include the plurality of inner tracks 40 having alternating depths. The diameter of the arcuate profile of each of the inner tracks 40 is complementary to the diameter of the arcuate profile of each of the outer tracks 28 corresponding thereto. As shown in FIGS. 1 and 3, a depth of each of the inner tracks 40 varies depending on a distance the inner element outer surface 32 is from the inner element axis 38. The inner element 18 includes eight inner tracks 40 formed therein. However, it is understood that each of the inner tracks 40 may have a non-arcuate profile and any number of the inner tracks 40 may be formed in the inner element 18. The plurality of inner tracks 40 is equally spaced about the inner element axis 38.

The inner element 18 is secured to the second member using a snap ring 42 disposed in a groove 44 formed in an outer surface of the second member 16. Alternately, any other type of fastener may be used to secure the inner element 18 to the second member.

Figure 2:
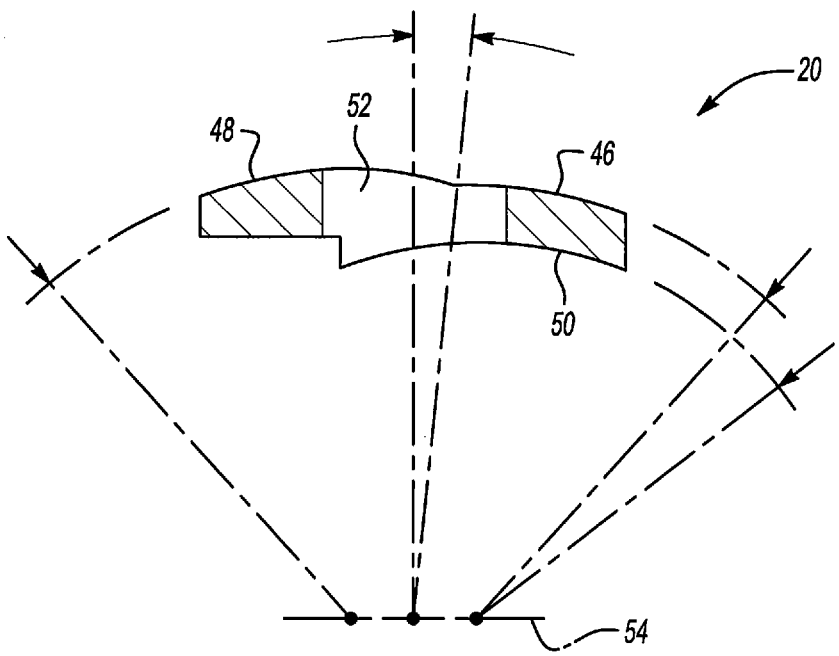
FIG. 2 is a cross-sectional view of an annular element of the double offset plunging constant velocity joint shown in FIG. 1.

The annular element 20, which is most clearly shown in FIG. 2, is disposed between the outer element 14 and the inner element 18. The annular element 20 is a hollow body machined from a rigid material such as steel. However, it is understood the annular element 20 may be formed using any other process from any other material. The annular element 20 includes a first spherical outer surface 46, a second spherical outer surface 48, and a spherical inner surface 50.

The plurality of perforations 52 is formed through the annular element 20. Each of the perforations is formed perpendicularly to an annular element axis 54. The annular element 20 includes eight perforation 52 formed therethrough. However, it is understood that any number of perforations 52 may be formed in the annular element 20. The plurality of perforations 52 is equally spaced about the annular element axis 54. Further, each of the perforations 52 may have a cylindrical shape, a substantially rectangular shape, or any other shape and may be formed obliquely to the annular element axis 54.

Figure 4:
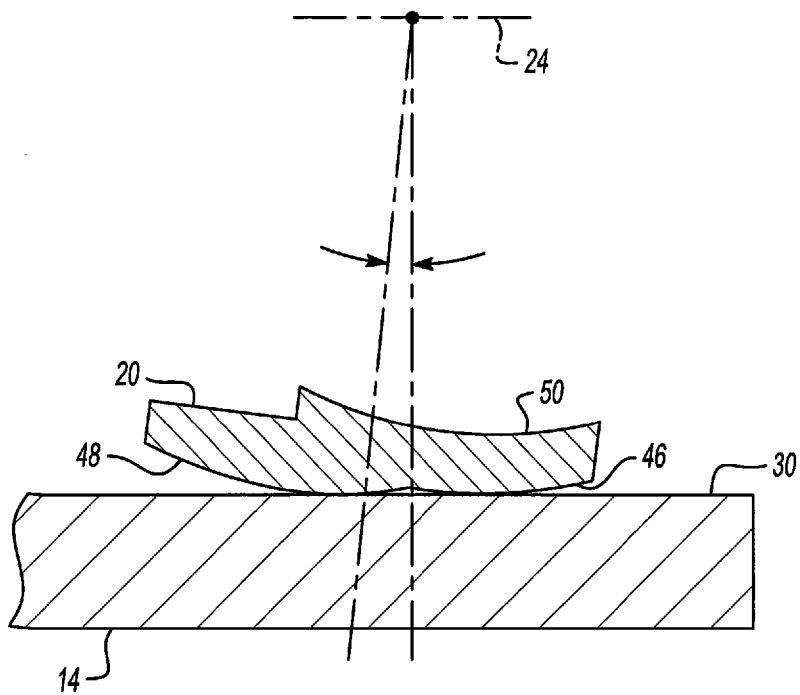
FIG. 4 is a fragmentary cross-sectional detail view of the double offset plunging constant velocity joint shown in FIG. 1, the joint shown in an articulated position and an inner element and a second member of the joint not shown.

The first spherical outer surface 46 has a center point common with the inner element outer surface 32, as most clearly seen in FIG. 1. A portion of the first spherical outer surface 46 defines a portion of each of the perforations 52. As shown in FIGS. 3 and 4, when the constant velocity joint 10 is in a fully articulated position, the first spherical outer surface 46 contacts the inner surface 30 of the outer element 14.

The second spherical outer surface 48 has a center point different from the inner element outer surface 32, as most clearly seen in FIG. 1. A portion of the second spherical outer surface 48 defines a portion of each of the perforations 52. The second spherical outer surface 48 is disposed against and slidingly engages the inner surface 30 of the outer element 14. A diameter of the second spherical outer surface 48 is complementary to the inner surface 30 of the outer element 14. The second spherical outer surface 48 and the inner surface 30 are precision machined for use as mating surfaces of a constant velocity joint as is known in the art.

The spherical inner surface 50 has a center point common with the inner element outer surface 32, as most clearly seen in FIG. 1. A portion of the spherical inner surface 50 defines a portion of each of the perforations 52. The spherical inner surface 50 is disposed against and slidingly engages the inner element outer surface 32. A radius of the spherical inner surface 50 is complementary to a radius of the inner element outer surface 32. The spherical inner surface 50 and the inner element outer surface 32 are precision machined for use as mating surfaces of a constant velocity joint as is known in the art.

The plurality of torque transferring elements 22 comprises steel spheres disposed in each of the perforations 52, the outer tracks 28, and the inner tracks 40. Each of the torque transferring elements 22 is a ball bearing as is known in the art. However, it is understood that the plurality of torque transferring elements 22 may be any other shape and formed from any other rigid material. A diameter of each of the torque transferring elements 22 is complementary to the diameter of the arcuate profiles of each of the outer tracks 28 and the inner tracks 40. The torque transferring elements 22, the outer tracks 28, and the inner tracks 40 are precision machined for use as mating surfaces of a constant velocity joint as is known in the art. One torque transferring element 22 is disposed and in sliding engagement with each of the outer tracks 28 and each of the inner tracks 40.

In use, the constant velocity joint 10 facilitates articulation between the first member 12 and the second member 16. As shown in FIG. 4, a maximum articulation angle of the annular element 20 with respect to the outer element 14 about the center point of the second spherical outer surface 48 occurs when the first spherical outer surface 46 contacts the inner surface 30 of the outer element 14. As further shown in FIG. 4, the inner element 18 and the second member 16 articulate with respect to the annular element 20 about the center point of the inner element outer surface 32. Abutment of the first spherical outer surface 46 and the inner surface 30 prevents movement of each of the torque transferring elements 22 with respect to the inner element 18, defining a maximum articulation angle of the inner element 18 with respect to the annular element 20. A total articulation angle of the constant velocity joint 10 is defined by combining the maximum articulation angle of the annular element 20 with respect to the outer element 14 about the center point of the second spherical outer surface 48 and the maximum articulation angle of the inner element 18 with respect to the annular element 20 about the center point of the inner element outer surface 32. The plurality of torque transferring elements 22 cooperate with the plurality of outer tracks 28 and the plurality of inner tracks 40 to position the annular element 20 in a plane bisecting an angle formed by the outer element axis 24 and the inner element axis 38.

The constant velocity joint 10 also facilitates axial displacement between the first member 12 and the second member 16. When a force is exerted along one of the outer element axis 24 and the inner element axis 38, the torque transferring elements 22 are displaced along the outer tracks 28 to allow the first member 12 to be axially displaced with respect to the second member 16. Further, it is understood that the first member 12 and the second member 16 may simultaneously be articulated and axially displaced.

FIG. 5-8 shows an alternative embodiment of the constant velocity joint 10. Similar structural features of the constant velocity joint 10 include the same reference numeral and a prime (') symbol.

A constant velocity joint 70 preferably comprises a first member 72 including an outer element 74, a second member 16' including an inner element 18', an annular element 20', a plurality of torque transferring elements 22', and a retaining element 78. As shown, the constant velocity joint 70 is a double offset fixed constant velocity joint, meaning a joint pivot point is defined by a midpoint of two separate points of articulation.

The outer element 74 is a hollow cylindrical portion of the first member 72 formed from a rigid material such as a steel. As shown, the outer element 74 is formed separate from the first member 72 and coupled thereto. However, it is understood the outer element 74 may be formed using any other process from any other material. The outer element 74 has an inner surface 76. The inner surface 76 defines a first spherical retention surface 80, a second spherical retention surface 81, a retaining element shoulder 82, and a retention groove 84.

A plurality of outer tracks 28' is formed in a cylindrical portion of the inner surface 76 of the outer element 74. Each of the outer tracks 28' has an arcuate profile having a diameter and a centerline parallel to the outer element axis 24'. Alternately, the outer element 14' may include the plurality of outer tracks 28' having alternating depths. The outer element 14' includes eight outer tracks 28' formed therein. However, it is understood that each of the outer tracks 28' may have a non-arcuate profile and any number of the outer tracks 28' may be formed in the outer element 74. The plurality of outer tracks 28' is equally spaced about the outer element axis 24'.

The first spherical retention surface 80 is a portion of an inner surface 76 of the outer element 74. The first spherical retention surface 80 is defined by portions of the inner surface 76 between each of the outer tracks 28'. The first spherical retention surface 80 has a center point common with a second spherical outer surface 48' of the annular element 20', as most clearly seen in FIGS. 5 and 6. The first spherical retention surface 80 is disposed against and slidingly engages the second spherical outer surface 48'. A radius of the first spherical retention surface 80 is complementary to a radius of the second spherical outer surface 48'. The first spherical retention surface 80 and the second spherical outer surface 48' are precision machined for use as mating surfaces of a constant velocity joint as is known in the art. The first spherical retention surface 80 is formed adjacent the retaining element shoulder 82.

The second spherical retention surface 81 is a portion of an inner surface 76 of the outer element 74. The second spherical retention surface 81 is defined by portions of the inner surface 76 between each of the outer tracks 28'. The second spherical retention surface 81 has a center point common with a first spherical outer surface 46' of the annular element 20' when the constant velocity joint 70 is in an articulated position, as most clearly seen in FIGS. 7 and 8. A radius of the second spherical retention surface 81 is complementary to a radius of the first spherical outer surface 46' when the constant velocity joint 70 is in an articulated position. The second spherical retention surface 81 and the first spherical outer surface 46' are precision machined for use as mating surfaces of a constant velocity joint as is known in the art. The second spherical retention surface 81 is formed adjacent the first spherical retention surface 80.

The retaining element shoulder 82 is a stepped portion of the inner surface 76 of the outer element 74. The retaining element shoulder 82 has a diameter greater than a diameter of the inner surface 76 of the outer element 74. The retaining element shoulder 82 receives the retaining element 78.

The retaining element 78 is a ring shaped member disposed in the outer element 74, against the retaining element shoulder 82. The retaining element 78 as shown has a cross section having two pairs of opposing parallel sides and an oblique side, but it is understood that the retaining element 78 may have any other cross-sectional shape. The oblique side of the cross section defines a conical retention surface 86. The conical retention surface 86 is disposed against and slidingly engages the second spherical outer surface 48' when the retaining element 78 is disposed against the retaining element shoulder 82. The conical retention surface 86 and the second spherical outer surface 48' are precision machined for use as mating surfaces of a constant velocity joint as is known in the art. Alternately, a portion of the retaining element 78 may be threadingly engaged with the outer element 74 and the conical retention surface 86 may be a spherical retention surface.

The retention groove 84 is an annular recess formed in the inner surface 76 of the outer element 74. The retention groove 84 has a rectangular cross section, but it is understood the retention groove 84 may be any other shape. A diameter of the retention groove 84 is greater than a diameter of the retaining element shoulder 82 and the inner diameter 26' of the inner surface 76. The retention groove 84 receives a fastener 88. The fastener 88 is a snap ring as is known in the art; however, it is understood other fasteners such as a threaded annulet, retaining pins, or other fasteners may also be used.

Figure 7:
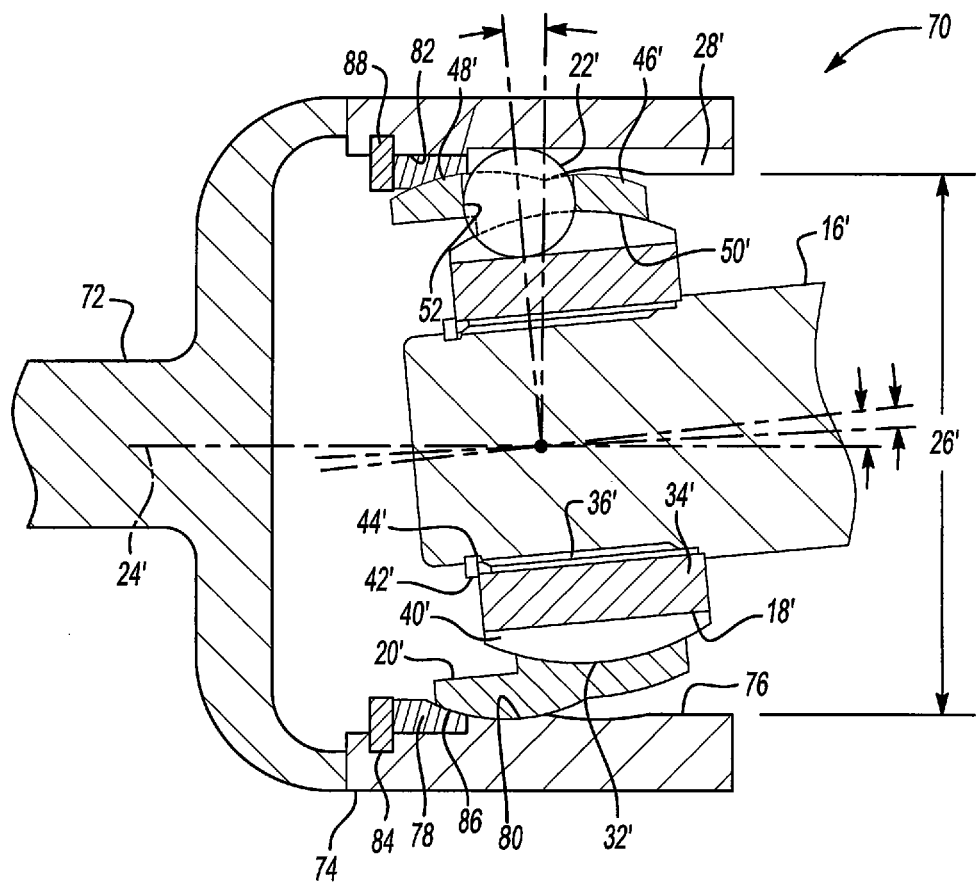
FIG. 7 is a cross-sectional view of the double offset fixed constant velocity joint shown in FIG. 5, the joint shown in an articulated position.
Figure 8:
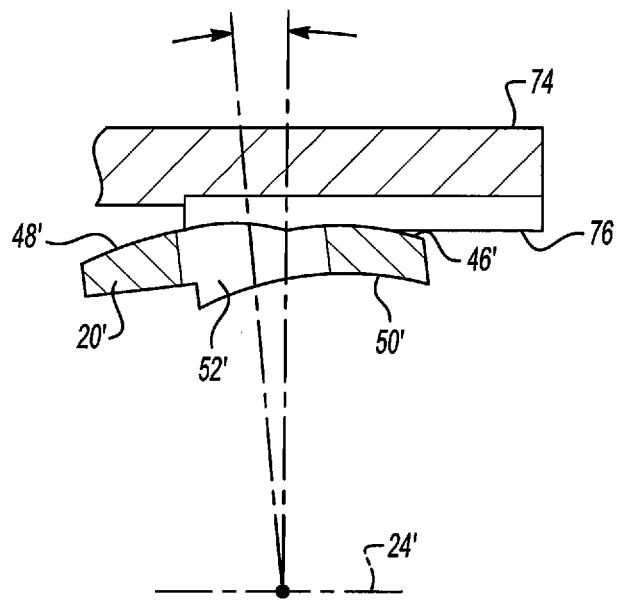
FIG. 8 is a fragmentary cross-sectional detail view of the double offset fixed constant velocity joint shown in FIG. 5, the joint shown in an articulated position and an inner element and a second member of the joint not shown.

In use, the constant velocity joint 70 facilitates articulation between the first member 72 and the second member 16'. As shown in FIGS. 7 and 8, a maximum articulation angle of the annular element 20' with respect to the first spherical retention surface 80 of the outer element 74 about the center point of the second spherical outer surface 48' occurs when the first spherical outer surface 46' contacts the inner surface 76 of the outer element 74. As further shown in FIGS. 7 and 8, the inner element 18' and the second member 16' articulate with respect to the annular element 20' about the center point of the inner element outer surface 32'. Abutment of the first spherical outer surface 46' and the inner surface 76 prevents movement of each of the torque transferring elements 22' with respect to the inner element 18', defining a maximum articulation angle of the inner element 18' with respect to the annular element 20'. A total articulation angle of the constant velocity joint 70 is defined by combining the maximum articulation angle of the annular element 20' with respect to the first spherical retention surface 80 of the outer element 74 about the center point of the second spherical outer surface 48' and the maximum articulation angle of the inner element 18' with respect to the annular element 20' about the center point of the inner element outer surface 32'.

FIG. 9-12 shows an alternative embodiment of the constant velocity joint 10. Similar structural features of the constant velocity joint 10 include the same reference numeral and a double prime (") symbol.

The constant velocity joint 100 preferably comprises a first member 12" including an outer element 14", a second member 16" including an inner element 18", an annular element 102, and a plurality of torque transferring elements 22". As shown, the constant velocity joint 100 is a double offset plunging constant velocity joint, meaning a joint pivot point is defined by a midpoint of two separate points of articulation and the constant velocity joint 100 accommodates axial translation.

Figure 10:
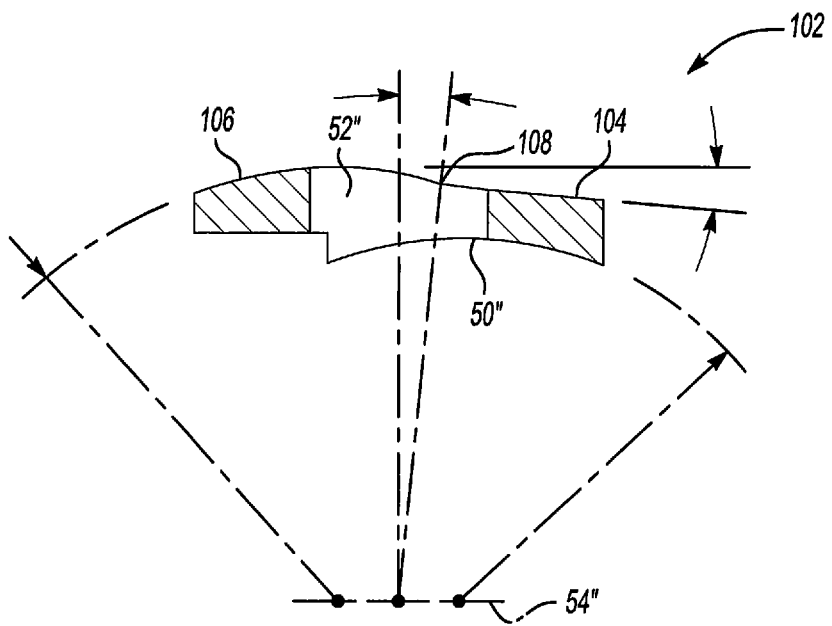
FIG. 10 is a cross-sectional view of an annular element of the double offset plunging constant velocity joint shown in FIG. 9.

The annular element 102, which is most clearly shown in FIG. 10, is disposed between the outer element 14" and the inner element 18". The annular element 102 is a hollow body machined from a rigid material such as steel. However, it is understood the annular element 102 may be formed using any other process from any other material. The annular element 102 includes a conical outer surface 104, an element spherical outer surface 106, and a spherical inner surface 50". A plurality of perforations 52" is formed through the annular element 102.

Figure 9:
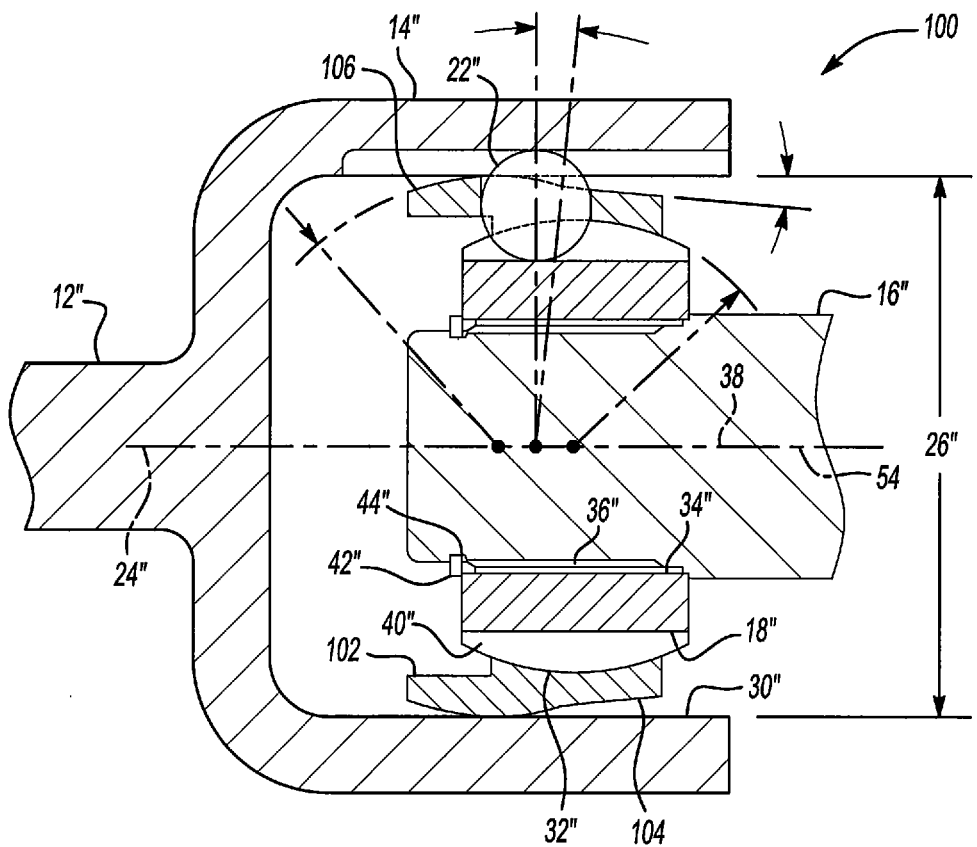
FIG. 9 is a cross-sectional view of a double offset plunging constant velocity joint according to another embodiment of the present invention.
Figure 11:
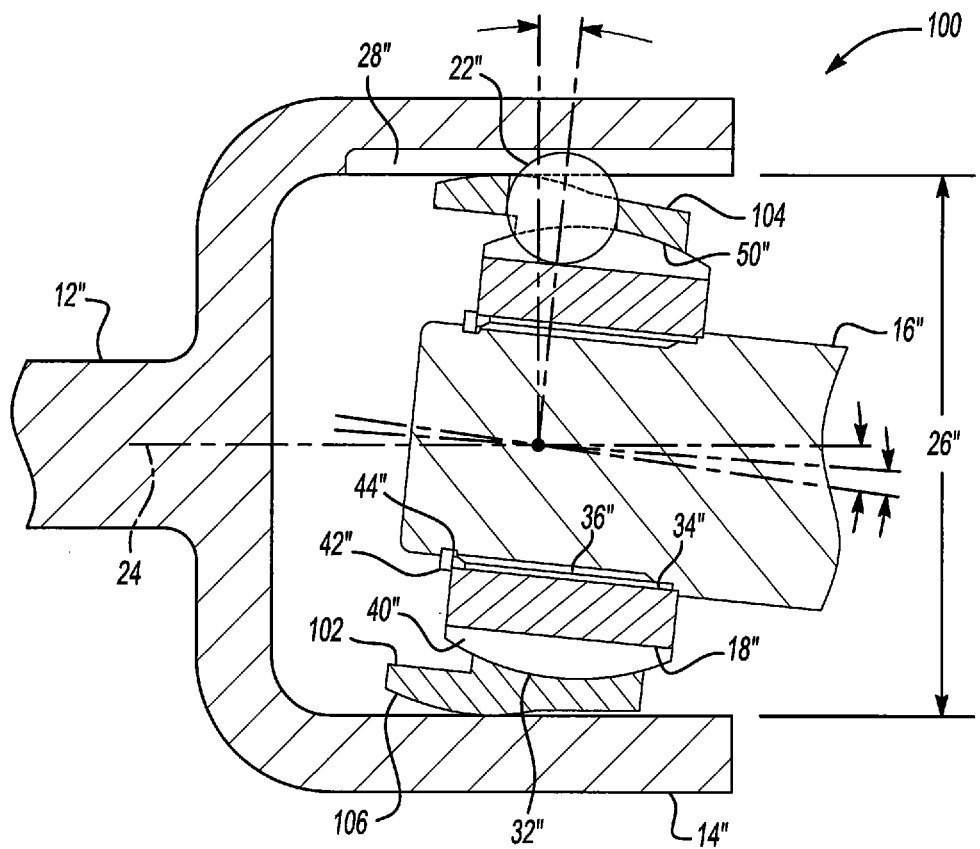
FIG. 11 is a cross-sectional view of the double offset plunging constant velocity joint shown in FIG. 9, the joint shown in an articulated position.
Figure 12:
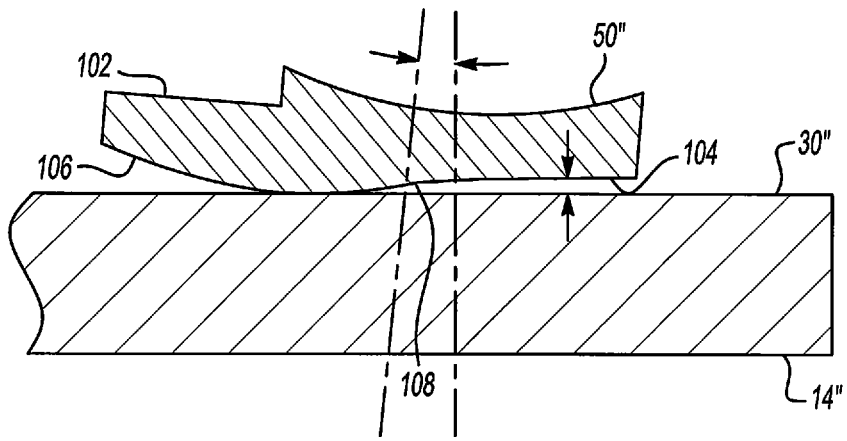
FIG. 12 is a fragmentary cross-sectional detail view of the double offset plunging constant velocity joint shown in FIG. 9, the joint shown in an articulated position and an inner element and a second member of the joint not shown.

The conical outer surface 104 is a tapered portion of the annular element 102 most clearly seen in FIGS. 9 and 10. A portion of the conical outer surface 104 defines a portion of each of the perforations 52". As shown in FIGS. 11 and 12, when the constant velocity joint 100 is in a fully articulated position, the conical outer surface 104 is substantially parallel to but does not contact the inner surface 30" of the outer element 14".

The element spherical outer surface 106 has a center point different from the inner element outer surface 32", as most clearly seen in FIG. 9. A portion of the element spherical outer surface 106 defines a portion of each of the perforations 52". The element spherical outer surface 106 is disposed against and slidingly engages the inner surface 30" of the outer element 14". A diameter of the element spherical outer surface 106 is complementary to the inner surface 30" of the outer element 14". The element spherical outer surface 106 and the inner surface 30" are precision machined for use as mating surfaces of a constant velocity joint as is known in the art. As most clearly shown in FIGS. 10 and 12, the element spherical outer surface 106 is non-tangential to the conical outer surface 104. A surface vertex 108 directed radially inwardly with respect to the annular element 102 is formed between the conical outer surface 104 and the element spherical outer surface 106.

The spherical inner surface 50" has a center point common with the inner element outer surface 32", as most clearly seen in FIG. 9. A portion of the spherical inner surface 50" defines a portion of each of the perforations 52". The spherical inner surface 50" is disposed against and slidingly engages the inner element outer surface 32". A radius of the spherical inner surface 50" is complementary to a radius of the inner element outer surface 32". The spherical inner surface 50" and the inner element outer surface 32" are precision machined for use as mating surfaces of a constant velocity joint as is known in the art.

FIG. 13-16 shows an alternative embodiment of the constant velocity joint 10. Similar structural features of the constant velocity joint 10 include the same reference numeral and a triple prime ('") symbol.

A constant velocity joint 120 preferably comprises a first member 122 including an outer element 124, a second member 16'" including an inner element 18'", an annular element 126, a plurality of torque transferring elements 22'", and a retaining element 128. As shown, the constant velocity joint 120 is a double offset fixed constant velocity joint, meaning a joint pivot point is defined by a midpoint of two separate points of articulation.

The outer element 124 is a hollow cylindrical portion of the first member 122 formed from a rigid material such as a steel. As shown, the outer element 124 is formed separate from the first member 122 and coupled thereto. However, it is understood the outer element 124 may be formed using any other process from any other material. The outer element has an inner surface 130. The inner surface 130 defines a first spherical retention surface 132, a retaining element shoulder 134, and a retention groove 136.

A plurality of outer tracks 28''' is formed in a cylindrical portion of the inner surface 130 of the outer element 124. Each of the outer tracks 28''' has an arcuate profile having a diameter and a centerline parallel to the outer element axis 24'''. Alternately, the outer element 124 may include the plurality of outer tracks 28''' having alternating depths. The outer element 124 includes eight outer tracks 28''' formed therein. However, it is understood that each of the outer tracks 28''' may have a non-arcuate profile and any number of the outer tracks 28' may be formed in the outer element 124. The plurality of outer tracks 28''' is equally spaced about the outer element axis 24'''.

The first spherical retention surface 132 is a portion of an inner surface 130 of the outer element 124. The first spherical retention surface 132 is defined by portions of the inner surface 130 between each of the outer tracks 28'''. The first spherical retention surface 132 has a center point common with an element spherical outer surface 138 of the annular element 126, as most clearly seen in FIGS. 14 and 16. The first spherical retention surface 132 is disposed against and slidingly engages the element spherical outer surface 138. A radius of the first spherical retention surface 132 is complementary to a radius of the element spherical outer surface 138. The first spherical retention surface 132 and the element spherical outer surface 138 are precision machined for use as mating surfaces of a constant velocity joint as is known in the art. The first spherical retention surface 132 is formed adjacent the retaining element shoulder 134.

The retaining element shoulder 134 is a stepped portion of the inner surface 130 of the outer element 124. The retaining element shoulder 134 is cylindrical in shape and has a diameter greater than a diameter of the inner surface 130 of the outer element 124. The retaining element shoulder 134 receives the retaining element 128.

The retaining element 128 is a ring shaped member disposed in the outer element 124, against the retaining element shoulder 134. The retaining element 128 as shown has a cross section having two pairs of opposing parallel sides and an oblique side, but it is understood that the retaining element 128 may have any other cross-sectional shape. The arcuate side of the cross section defines a conical retention surface 140. The conical retention surface 140 is disposed against and slidingly engages the element spherical outer surface 138 when the retaining element 128 is disposed against the retaining element shoulder 134. The conical retention surface 140 and the element spherical outer surface 138 are precision machined for use as mating surfaces of a constant velocity joint as is known in the art. Alternately, a portion of the retaining element 128 may be threadingly engaged with the outer element 124 and the conical retention surface 140 may be a spherical retention surface.

The retention groove 136 is an annular recess formed in the inner surface 130 of the outer element 124. The retention groove 136 has a rectangular cross section, but it is understood the retention groove 136 may be any other shape. A diameter of the retention groove 136 is greater than a diameter of the retaining element shoulder 134 and an inner diameter 26''' of the inner surface 130. The retention groove 136 receives a fastener 142. The fastener 142 is a snap ring as is known in the art; however, it is understood other fasteners such as a threaded annulet, retaining pins, or other fasteners may also be used.

Figure 16:
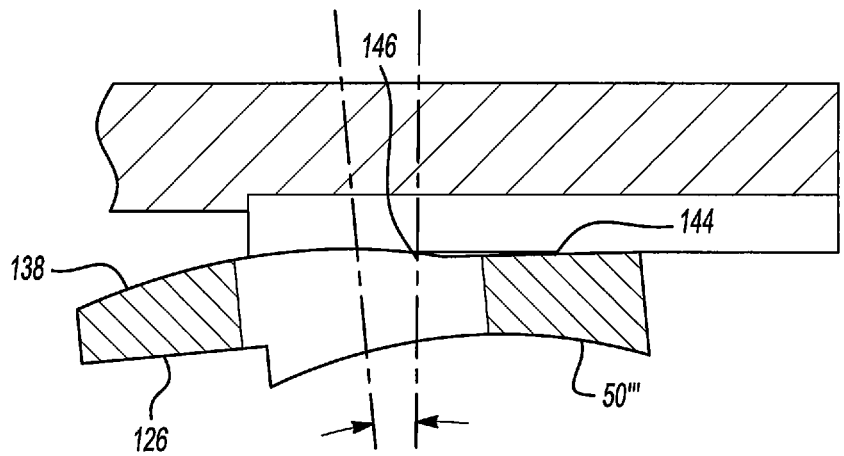
FIG. 16 is a fragmentary cross-sectional detail view of the double offset fixed constant velocity joint shown in FIG. 13, the joint shown in an articulated position and an inner element and a second member of the joint not shown.

The annular element 126, which is most clearly shown in FIG. 16, is disposed between the outer element 124 and the inner element 18'''. The annular element 126 is a hollow body machined from a rigid material such as steel. However, it is understood the annular element 126 may be formed using any other process from any other material. The annular element 126 includes a conical outer surface 144, the element spherical outer surface 138, and a spherical inner surface 50'''. A plurality of perforations 52''' is formed through the annular element 126.

Figure 13:
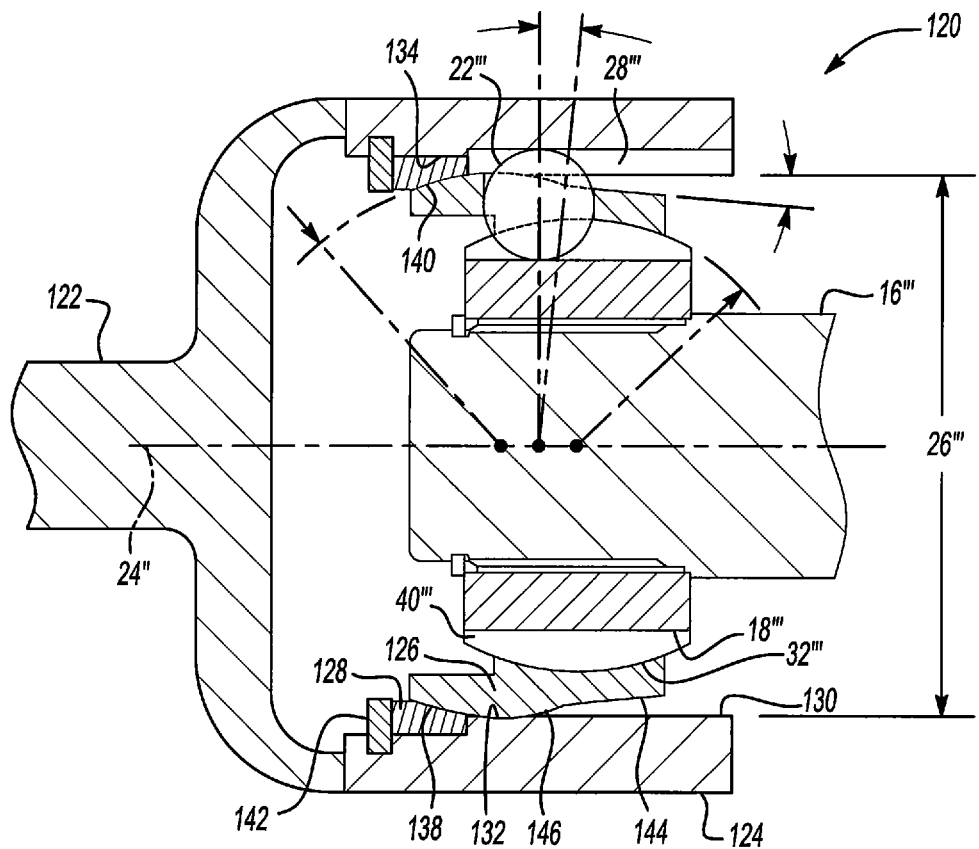
FIG. 13 is a cross-sectional view of a double offset fixed constant velocity joint according to another embodiment of the present invention.
Figure 14:
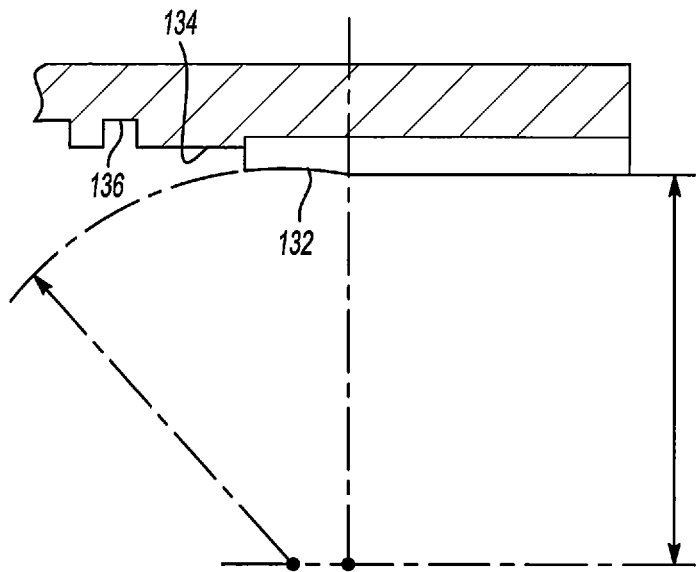
FIG. 14 is a cross-sectional view of an outer element of the double offset fixed constant velocity joint shown in FIG. 13.
Figure 15:
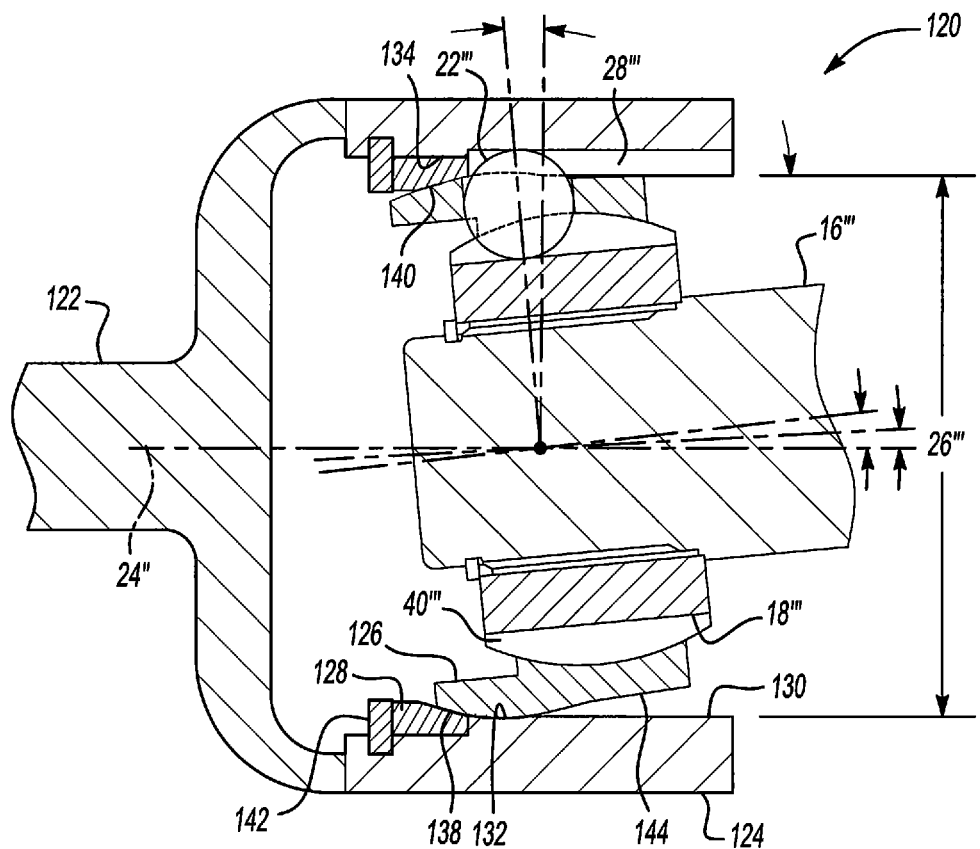
FIG. 15 is a cross-sectional view of the double offset fixed constant velocity joint shown in FIG. 13, the joint shown in an articulated position.

The conical outer surface 144 is a tapered portion of the annular element 126 most clearly seen in FIGS. 13 and 16. A portion of the conical outer surface 144 defines a portion of each of the perforations 52'''. As shown in FIGS. 15 and 16, when the constant velocity joint 120 is in a fully articulated position, the conical outer surface 144 is substantially parallel to and contacts the inner surface 130 of the outer element 124.

The element spherical outer surface 138 has a center point different from the inner element outer surface 32''', as most clearly seen in FIG. 13. A portion of the element spherical outer surface 138 defines a portion of each of the perforations 52'''. The element spherical outer surface 138 is disposed against and slidingly engages the inner surface 130 of the outer element 124. A diameter of the element spherical outer surface 130 is complementary to the inner surface 130 of the outer element 124. The element spherical outer surface 130 and the inner surface 130 are precision machined for use as mating surfaces of a constant velocity joint as is known in the art. As most clearly shown in FIG. 16, the element spherical outer surface 138 is non-tangential to the conical outer surface 144. A surface vertex 146 directed radially inwardly with respect to the annular element 126 is formed between the conical outer surface 144 and the element spherical outer surface 138.

In use, the constant velocity joint 120 facilitates articulation between the first member 122 and the second member 16'''. As shown in FIGS. 15 and 16, a maximum articulation angle of the annular element 126 with respect to the first spherical retention surface 132 of the outer element 124 about the center point of the element spherical outer surface 138 occurs when the conical outer surface 144 contacts the inner surface 130 of the outer element 124. As further shown in FIG. 15, the inner element 18''' and the second member 16''' articulate with respect to the annular element 126 about the center point of the inner element outer surface 32'''. Abutment of the conical outer surface 144 and the inner surface 130 prevents movement of each of the torque transferring elements 22''' with respect to the inner element 18''', defining a maximum articulation angle of the inner element 18''' with respect to the annular element 126. A total articulation angle of the constant velocity joint 120 is defined by combining the maximum articulation angle of the annular element 126 with respect to the first spherical retention surface 132 of the outer element 124 about the center point of the element spherical outer surface 138 and the maximum articulation angle of the inner element 18''' with respect to the annular element 126 about the center point of the inner element outer surface 32'''.

Figure 17:
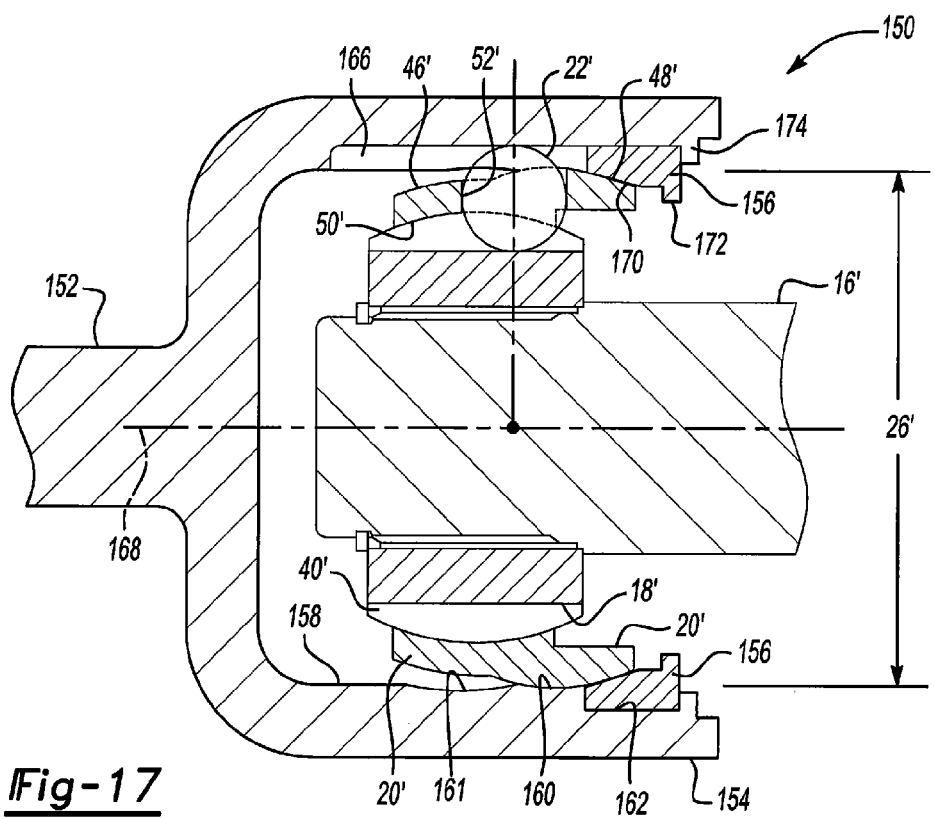
FIG. 17 is a cross-sectional view of a double offset fixed constant velocity joint according to another embodiment of the present invention.

FIG. 17 shows an alternative embodiment of the constant velocity joint 70. Similar structural features of the constant velocity joint 70 include the same reference numeral.

A constant velocity joint 150 preferably comprises a first member 152 including an outer element 154, a second member 16' including an inner element 18', an annular element 20', a plurality of torque transferring elements 22', and a retaining element 156. As shown, the constant velocity joint 150 is a double offset fixed constant velocity joint, meaning a joint pivot point is defined by a midpoint of two separate points of articulation.

The outer element 154 is a hollow cylindrical portion of the first member 152 formed from a rigid material such as a steel. As shown, the outer element 154 is unitarily formed with the first member 152. However, it is understood the outer element 154 may be formed separate from the first member 152 and coupled thereto. The outer element 154 has an inner surface 158. The inner surface 158 defines a first spherical retention surface 160, a second spherical retention surface 161, and a retaining element shoulder 162.

A plurality of outer tracks 166 is formed in a cylindrical portion of the inner surface 158 of the outer element 154. Each of the outer tracks 166 has an arcuate profile having a diameter and a centerline parallel to an outer element axis 168. Alternately, the outer element 154 may include the plurality of outer tracks 166 having alternating depths. The outer element 154 includes eight outer tracks 166 formed therein. However, it is understood that each of the outer tracks 166 may have a non-arcuate profile and any number of the outer tracks 166 may be formed in the outer element 154. The plurality of outer tracks 166 is equally spaced about the outer element axis 168.

The first spherical retention surface 160 is a portion of the inner surface 158 of the outer element 154. The first spherical retention surface 160 is formed on an end of the outer element 154 opposite the first member 152. The first spherical retention surface 160 is defined by portions of the inner surface 158 between each of the outer tracks 166. The first spherical retention surface 160 has a center point common with the second spherical outer surface 48' of the annular element 20'. The first spherical retention surface 160 is disposed against and slidingly engages the second spherical outer surface 48'. A radius of the first spherical retention surface 160 is complementary to a radius of the second spherical outer surface 48'. The first spherical retention surface 160 and the second spherical outer surface 48' are precision machined for use as mating surfaces of a constant velocity joint as is known in the art. The first spherical retention surface 80 is formed adjacent the retaining element shoulder 82.

The second spherical retention surface 161 is a portion of an inner surface 158 of the outer element 154. The second spherical retention surface 161 is defined by portions of the inner surface 158 between each of the outer tracks 166. The second spherical retention surface 161 has a center point common with a first spherical outer surface 46' of the annular element 20' when the constant velocity joint 150 is in an articulated position. A radius of the second spherical retention surface 161 is complementary to a radius of the first spherical outer surface 46' when the constant velocity joint 150 is in an articulated position. The second spherical retention surface 161 and the first spherical outer surface 46' are precision machined for use as mating surfaces of a constant velocity joint as is known in the art. The second spherical retention surface 161 is formed adjacent the first spherical retention surface 160.

The retaining element shoulder 162 is a stepped portion of the inner surface 158 of the outer element 154. The retaining element shoulder 162 is formed on an end of the outer element 154 opposite the first member 152. The retaining element shoulder 162 is cylindrical in shape and has a diameter greater than a diameter of the inner surface 158 of the outer element 154. The retaining element shoulder 162 receives the retaining element 156.

The retaining element 156 is a ring shaped member disposed in the outer element 154, against the retaining element shoulder 162. The retaining element 156 as shown has a cross section having two pairs of opposing parallel sides and an oblique side, but it is understood that the retaining element 156 may have any other cross-sectional shape. The oblique side of the cross section defines a conical retention surface 170. The conical retention surface 170 is disposed against and slidingly engages the second spherical outer surface 48' when the retaining element 156 is disposed against the retaining element shoulder 162. The conical retention surface 170 and the second spherical outer surface 48' are precision machined for use as mating surfaces of a constant velocity joint as is known in the art. The retaining element includes an extraction lip 172. The extraction lip 172 is an annular protuberance extending radially inwardly from the retaining element 156.

A plurality of outer element stakes 174 are unitarily formed with the outer element 154 to secure the retaining element 156 against the retaining element shoulder 162. After the retaining element 156 is disposed against the retaining element shoulder 162 a press or other tool is used to elastically deform each of the outer element stakes 174 away from the inner surface 158 of the outer element 154. Alternately, a press or tool may be used to deform the outer element 154 itself to form the outer element stakes 174.

Figure 18:
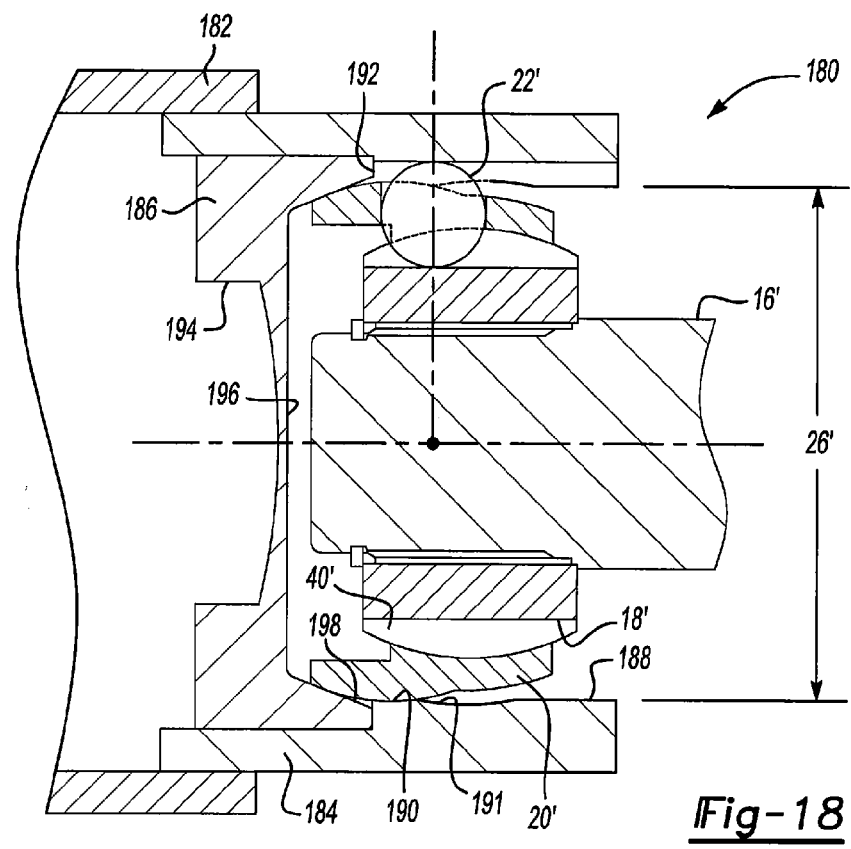
FIG. 18 is a cross-sectional view of a double offset fixed constant velocity joint according to another embodiment of the present invention.

FIG. 18 shows an alternative embodiment of the constant velocity joint 70. Similar structural features of the constant velocity joint 70 include the same reference numeral.

A constant velocity joint 180 preferably comprises a first member 182 including an outer element 184, a second member 16' including an inner element 18', an annular element 20', a plurality of torque transferring elements 22', and a threaded retaining element 186. As shown, the constant velocity joint 180 is a double offset fixed constant velocity joint, meaning a joint pivot point is defined by a midpoint of two separate points of articulation.

The outer element 184 is a hollow cylindrical portion of the first member 182 formed from a rigid material such as a steel. As shown, the outer element 184 is formed separate and coupled to the first member 182. The outer element 184 has an inner surface 188. The inner surface 188 defines a first spherical retention surface 190, a second spherical retention surface 191, and a retaining element shoulder 192.

The retaining element shoulder 192 is a stepped portion of the inner surface 188 having a thread formed thereon. The retaining element shoulder 192 is formed on an end of the outer element 184 adjacent the first member 182. The retaining element shoulder 192 is cylindrical in shape and has a diameter greater than a diameter of the inner surface 188 of the outer element 184. The retaining element shoulder 192 receives the threaded retaining element 186.

The threaded retaining element 186 is a threaded cylindrical member disposed in the outer element 184, threadingly engaged with the retaining element shoulder 192. The threaded retaining element 186 as shown includes a tool engaging recess 194 and an element engaging recess 196. The tool engaging recess 194 is formed opposite the element engaging recess 196 and is preferably hexagonal in shape. However, it is understood that the tool engaging recess 196 may be any other shape. The element engaging recess 196 includes a conical retention surface 198. The conical retention surface 198 is disposed against and slidingly engages the second spherical outer surface 48' when the threaded retaining element 186 is disposed against the retaining element shoulder 192. A radius of the conical retention surface 198 is complementary to a radius of the second spherical outer surface 48'. The conical retention surface 198 and the second spherical outer surface 48' are precision machined for use as mating surfaces of a constant velocity joint as is known in the art.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A constant velocity joint, comprising:
an outer element having an outer element axis, a plurality of outer tracks formed therein, and an inner surface, the plurality of outer tracks parallel to the outer element axis;
an inner element having an inner element axis, a spherical outer surface, and a plurality of inner tracks, the plurality of inner tracks parallel to the inner element axis, the spherical outer surface having a center different from a joint pivot point;
an annular element having a first spherical outer surface, a second spherical outer surface, a spherical inner surface, and a plurality of perforations formed through the annular element, the first spherical outer surface and the spherical inner surface having a center common with the spherical outer surface of the inner element, the second spherical outer surface having a center different from a joint pivot point and the center of the first spherical outer surface, the second spherical outer surface having a diameter complementary to a diameter of the inner surface of the outer element, the annular element disposed between the inner element and the outer element; and
a retaining element disposed against the outer element in contact with the second spherical outer surface of the annular element;
a plurality of torque transferring elements disposed in the perforations formed through the annular element, each of the torque transferring elements contacting one of the outer tracks and one of the inner tracks, wherein the plurality of torque transferring elements cooperate with the plurality of outer tracks and the plurality of inner tracks to position the annular element in a plane bisecting an angle formed by the outer element axis and the inner element axis.

2. The constant velocity joint according to claim 1, wherein the constant velocity joint is a fixed constant velocity joint.

3. The constant velocity joint according to claim 2, wherein the inner surface of the outer element defines an outer element inner spherical surface in contact with and complementary to the second spherical outer surface of the annular element.

4. The constant velocity joint according to claim 1, wherein the retaining element includes an inner surface in contact with and complementary to the second spherical outer surface of the annular element.

5. The constant velocity joint according to claim 1, wherein the outer element further comprises a retention feature formed therein for securing the retaining element within the outer element.

6. The constant velocity joint according to claim 5, wherein the retention feature is a groove formed in the outer element for receiving a fastener.

7. The constant velocity joint according to claim 1, wherein the retaining element is disposed against a retaining element shoulder of the outer element.

8. A fixed constant velocity joint, comprising:
an outer element having an outer element axis, a plurality of outer tracks formed therein, an outer element inner spherical surface defined by an inner surface of the outer element, and a retaining element shoulder, the plurality of outer tracks parallel to the outer element axis;
an inner element having an inner element axis, a spherical outer surface, and a plurality of inner tracks, the plurality of inner tracks parallel to the inner element axis, the spherical outer surface having a center different from a joint pivot point;
an annular element having a first spherical outer surface, a second spherical outer surface, a spherical inner surface, and a plurality of perforations formed through the annular element, the first spherical outer surface and the spherical inner surface having a center common with the spherical outer surface of the inner element, the second spherical outer surface having a center different from a joint pivot point and the center of the first spherical outer surface, the second spherical outer surface having a diameter complementary to a diameter of the outer element inner spherical surface, the annular element disposed between the inner element and the outer element; and
a plurality of torque transferring elements disposed in the perforations formed through the annular element, each of the torque transferring elements contacting one of the outer tracks and one of the inner tracks,
a retaining element disposed against the retaining element shoulder of the outer element, the retaining element in contact with the second spherical outer surface, the retaining element including an inner surface in contact with and complementary to the element spherical outer surface, wherein the plurality of torque transferring elements cooperate with the plurality of outer tracks and the plurality of inner tracks to position the annular element in a plane bisecting an angle formed by the outer element axis and the inner element axis.

* * * * *